: US 8,296,249 B2
(45) Date of Patent: Oct. 23, 2012

(12) United States Patent
Iwakura et al.

(54) RULE LEARNING BY UPDATING TRAINING EXAMPLE AND A REMAINING FEATURE WEIGHTS

(75) Inventors: Tomoya Iwakura, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 12/505,529

(22) Filed: Jul. 20, 2009

(65) Prior Publication Data

US 2010/0023466 A1    Jan. 28, 2010

(30) Foreign Application Priority Data

Jul. 28, 2008    (JP) .................. 2008-193067

(51) Int. Cl.
*G06F 15/18* (2006.01)
(52) U.S. Cl. ........................................ 706/12
(58) Field of Classification Search .............. None
See application file for complete search history.

(56) References Cited

U.S. PATENT DOCUMENTS

2009/0287621 A1* 11/2009 Krupka et al. .................. 706/12

OTHER PUBLICATIONS

Redpath et al. "Boosting Feature Selection", ICAPR 2005, pp. 305-314.*
Yu et al. "Feature Weighting and Instance Selection for Collaborative Filtering: An Information-Theoretic Approach", KIS, 2003, pp. 25.*
Freund, Yoav et al.,"The alternating decision tree learning algorithm", In Proc. of 16th ICML 1999, p. 124-133.
Kudo, Taku et al.,"A Boosting Algorithm for Classification of Semi-Structured Text", Proceedings of EMNLP 2004 2004, p. 301-308.
Kudo, Taku et al.,"An Application of Boosting to Graph Classification", Proceedings of NIPS 2004 p. 729-736.
Quinlan, J. R. C4.5: Programs for Machine Learning, Morgan Kaufmann Series in Machine Learning, Morgan Kaufmann 1993, p. 17-26.
Schapire, Robert E. et al.,"Boostexter: A boosting-based system for text categorization", Machine Learning 39 (2/3) 2000, p. 135-168.
Schapire, Robert E. et al.,"Improved boosting using confidence-rated predictions", Machine Learning 37(3) 1999, p. 297-336.
Sebastiani, Fabrizio et al.,"An Improved Boosting Algorithm and its Application to Text Categorization", In Proc. of International Conference on Information and Knowledge Management 2000, p. 78-85.

* cited by examiner

*Primary Examiner* — Alan Chen
*Assistant Examiner* — Li-Wu Chang
(74) *Attorney, Agent, or Firm* — Fujitsu Patent Center

(57) ABSTRACT

A rule learning method for making a computer perform rule learning processing in machine learning includes firstly calculating an evaluation value of respective features in a training example by using data and weights of the training examples; selecting a given number of features in descending order of the evaluation values; secondly calculating a confidence value for one of the given number of selected features; updating the weights of training example, by using the data and weights of the training examples, and the confidence value corresponding to the one feature; firstly repeating the updating for the remaining features of the given number of features; and secondly repeating, for a given number of times, the firstly calculating, the selecting, the secondly calculating, the updating, and the firstly repeating.

6 Claims, 17 Drawing Sheets

FIG. 3

| LABEL | WEIGHT | FEATURE |
|---|---|---|
| +1 | 1 | abc |
| -1 | 1 | abcd |
| +1 | 1 | abd |

FIG. 4

| RULE | SCORE |
|---|---|
| a | 0.414 |
| b | 0.414 |
| c | 0 |
| d | 0 |

FIG. 5

| RULE | CONFIDENCE VALUE |
|---|---|
| a | 0.279 |
| b | 0.279 |
| c | 0 |

FIG. 6

| LABEL | WEIGHT | FEATURE |
|---|---|---|
| +1 | 0.75 | abc |
| -1 | 1.32 | abcd |
| +1 | 0.75 | abd |

FIG. 7

| LABEL | WEIGHT | FEATURE |
|---|---|---|
| +1 | 0.56 | abc |
| -1 | 1.74 | abcd |
| +1 | 0.56 | abd |

FIG. 8

| LABEL | WEIGHT | FEATURE |
|---|---|---|
| +1 | 0.56 | abc |
| -1 | 1.74 | abcd |
| +1 | 0.56 | abd |

FIG. 9

| RULE | SCORE |
|---|---|
| a | 0.26 |
| b | 0.26 |
| c | 0.57 |
| d | 0.57 |

FIG. 12

| LABEL | WEIGHT | FEATURE |
|---|---|---|
| +1 | 1 | abc |
| -1 | 1 | abcd |
| +1 | 1 | abd |

FIG. 13

| RULE | SCORE |
|---|---|
| a | 0.414 |
| b | 0.414 |
| c | 0 |
| d | 0 |

FIG. 15

| LABEL | WEIGHT | FEATURE |
|---|---|---|
| +1 | 0.75 | abc |
| -1 | 1.32 | abcd |
| +1 | 0.75 | abd |

FIG. 16

| LABEL | WEIGHT | FEATURE |
|---|---|---|
| +1 | 0.71 | abc |
| -1 | 1.39 | abcd |
| +1 | 0.71 | abd |

FIG. 17

| LABEL | WEIGHT | FEATURE |
|---|---|---|
| +1 | 0.91 | abc |
| -1 | 1.08 | abcd |
| +1 | 0.71 | abd |

FIG. 18

| RULE | SCORE |
|---|---|
| a | 0.23 |
| b | 0.23 |
| c | 0.84 |
| d | 0.196 |

FIG. 19

| LABEL | WEIGHT | FEATURE |
|---|---|---|
| +1 | 0.78 | abc |
| -1 | 1.32 | abcd |
| +1 | 0.60 | abd |

FIG. 20

| LABEL | WEIGHT | FEATURE |
|---|---|---|
| +1 | 0.75 | abc |
| -1 | 1.32 | abcd |
| +1 | 0.58 | abd |

FIG. 21

| LABEL | WEIGHT | FEATURE |
|---|---|---|
| +1 | 0.75 | abc |
| -1 | 0.98 | abcd |
| +1 | 0.78 | abd |

RULE LEARNING BY UPDATING TRAINING EXAMPLE AND A REMAINING FEATURE WEIGHTS

CROSS REFERENCE TO RELATED APPLICATION

This application is based upon and claims the benefit of priority of the prior Japanese Patent Application No. 2008-193067, filed on Jul. 28, 2008, the entire contents of which are incorporated herein by reference.

FIELD

The present invention relates to a high-speed technique of rule learning for machine learning.

BACKGROUND

Among the various known machine learning algorithms, there exist algorithms referred to as "Boosting." Here, there will be discussed a learning technique based on a technique referred to as "AdaBoost" which is one of the Boosting algorithms. As for the AdaBoost technique, there exist, for example, a paper by Y. Freund and L. Mason (Y. Freund and L. Mason, "The alternating decision tree learning algorithm", In Proc. of 16th ICML, pages 124-133, 1999), and a paper by R. E. Schapire and Y. Singer (R. E. Schapire and Y. Singer, "Improved boosting using confidence-rated predictions", Machine Learning, 37(3): pages 297-336, 1999), and (R. E. Schapire and Y. Singer, "Boostexter: A boosting-based system for text categorization", Machine Learning, 39 (2/3): pages 135-168, 2000). In the following, Boosting, unless otherwise specified, refers to AdaBoost.

In Boosting, a plurality of weak hypotheses (e.g., rules) are generated from training examples having different weights by using a given weak learner for creating a final hypothesis consisting of the generated weak hypotheses. Each weak hypothesis is repeatedly generated from the training examples while the weights of the examples are changed. Finally, a final hypothesis, which is a combination of the weak hypotheses, is generated. A small weight is assigned to an example which can be correctly classified by the already learned weak hypotheses, and a large weight is assigned to an example which cannot be correctly classified by the already learned weak hypotheses.

The weights of the training examples are updated so as to reduce the upper bound of the training error, which is the number of errors for the training examples. The upper bound of the training error is a value greater than or equal to the actual number of training errors, and is the sum of the weights of the examples in Boosting. The number of training errors itself is lowered by lowering the upper bound of the training error.

A Boosting algorithm that handles a rule learner as the weak learner is used in the present description. Further, in the following, this algorithm will be described as a Boosting algorithm. First, there will be described a simple Boosting algorithm with reference to FIG. 1. First, a training sample $S=\{(x1, y1), (x2, y2), \ldots, (xm, ym)\}$ including m examples, each of which is a combination of a feature-set xi that includes one or more features, with a label yi that is either $-1$ or $+1$; m initial values $w1,i=1$ ($1 \leq i \leq m$) of weights that correspond to the m examples; an iteration frequency N; and a variable $t=1$ for counting the iteration frequency are set (at S101).

Then, a score (also referred to as gain) of each of the features included in the training sample is calculated according to the weights wt,i of the examples, so that a feature whose score becomes a maximum is extracted as a rule ft (at S103). The wt,i is the weight of the sample number i at round t. The calculation of the scores is performed by using, for example, equation (4) in Formula 6 as will be described below. Note that there is also a possibility that the number of features may be about 100,000, and where the number of examples included in the training sample may also be about 100,000. Thus, it may take considerable time to calculate the scores, but only one feature is selected.

Further, a confidence value ct of the rule ft is calculated by using the weights wt,i of the examples, and then the rule ft and the confidence value ct are stored as the t-th rule and confidence value (at S105). The calculation of the confidence value ct is performed by using, for example, equation (2) in Formula 4 or equation (7) in Formula 9 as will be described below.

Thereafter, new weights wt+1,i ($1 \leq i \leq m$) are calculated by using the weights wt,i of the examples, the rule ft, and the confidence value ct, and are registered to update the weights (S107). The calculation of the new weights wt+1,i is performed by using, for example, equation (6) in Formula 8 as will be described below.

Then, the value of the variable t is incremented by one (S109). When the value of the variable t is smaller than the iteration frequency N, the processing is returned to S103 (at S111: Yes). On the other hand, when the value of the variable t reaches the iteration frequency N (at S111: No), the processing is ended.

By using the combinations of the rules and the confidence values, which are obtained as a result of the above described processing, it is determined whether the label of a new input is $-1$ or $+1$.

As described above, only one combination of the rule and the confidence value can be generated in one iteration. Thus, there is a problem that when the number of features and the number of training examples are increased, the processing time increases enormously.

For this reason, a high-speed version of the Boosting algorithm was considered. This high-speed version of the Boosting algorithm illustrated as FIG. 2 is based on a paper by Sebastiani, Fabrizio, Alessandro Sperduti, and Nicola Valdambrini ("An improved boosting algorithm and its application to text categorization", In Proc. of International Conference on Information and Knowledge Management, pages 78-85, 2000). First, a training sample $S=\{(x1, y1), (x2, y2), \ldots, (xm, ym)\}$ including m examples, each of which is a combination of a feature-set xi that includes one or more features, with a label yi that is either $-1$ or $+1$; m initial values $w1,i=1$ ($1 \leq i \leq m$) of weights that correspond to the m examples; an iteration frequency N; the number v of rules learned at one time; and a variable $t=1$ for counting the iteration frequency are set (at S151). In order to facilitate understanding, there is described an example, in which the processing is performed on a training sample illustrated as FIG. 3. In FIG. 3, three training examples are included. The first training example includes a feature-set in which features of a, b, and c are included, and the label is $+1$. The weight of the first training example is 1. The second training example includes a feature-set in which features of a, b, c, and d are included, and the label is $-1$. The weight of the second training example is 1. The third training example includes a feature-set in which features of a, b, and d are included, and the label is $+1$. The weight of the third training example is 1.

Then, a score (also referred to as gain) of each of the features included in the training sample is calculated according to the weights wt,i of the examples, so that v features are extracted as rules f'j (1≦j≦v) in descending order of the scores (at S153). The calculation of the score is performed by using, for example, equation (4) in Formula 6 as will be described below. When the scores are calculated from the data illustrated as FIG. 3, a result illustrated in FIG. 4 is obtained. That is, the scores of the features a and b become "0.414" while the scores of the features c and d become "0". Here, when v is set as v=3, it is assumed that the features a, b, and c are selected.

Then, each confidence value c'j corresponding to the v number of rules f'j are collectively calculated by using the weights wt,i of the examples (at S155). The calculation of the confidence values c't is performed by using, for example, equation (2) in Formula 4 or equation (7) in Formula 9 as will be described below. At S155, the v confidence values c'j are calculated by using the same weights wt,i. In the above description, illustrated as FIG. 5, the confidence values of the rules a and b are calculated to be 0.279, while the confidence value of the rule c is calculated to be 0.

Here, j is initialized to 1 (at S157). Then, new weights wt+1,i (1≦i≦m) are calculated by the weights wt,i of the examples, the rule f'j, and the confidence value c'j, and are registered to update the weights (at S159). The calculation of the new weights wt+1,i is performed by using, for example, equation (6) in Formula 8 as will be described below. In the above described example, the calculation of weight is performed to a rule a. As illustrated in FIG. 6, the weights of the first and third training examples are updated to 0.75, while the weight of the second training example is updated to 1.32. Then, the rule f'j and the confidence value c'j are registered as the t-th rule and confidence value (at S161).

The value of variable t and the value of variable j are respectively incremented by one (at S163), and it is determined whether or not the value of j is equal to or less than the value of v (at S165). When the value of j is equal to or less than the value of v, the processing shifts to S159.

When j=2, and when S159 is performed, the weights are calculated for a rule b in the above described example, so that new weights are registered to update the weights used in the calculation illustrated as FIG. 7. That is, the weights of the first and third training examples are updated to 0.56, while the weight of the second training example is updated to 1.74.

Further, when j=3, and when S159 is performed, the weights are calculated for a rule c, so that new weights are registered to update the weights used in the calculation illustrated as FIG. 8. However, since the confidence value of the rule c is 0, FIG. 8 is the same as FIG. 7.

On the other hand, when j exceeds v, it is determined whether or not t is smaller than the iteration frequency N (at S167). When t<N, the processing returns to S153. The scores are again calculated in S153 so that the values of the scores are obtained as illustrated in FIG. 9. That is, the scores of the rules a and b become "0.26" while the scores of the rules c and d become "0.57".

On the other hand, when t reaches the iteration frequency N (at S167: No), the processing is ended.

By using the combinations of the rules and the confidence values obtained as a result of the above described processing, it is determined whether the label of a new input is −1 or +1.

By performing the processing illustrated as FIG. 2, a plurality of combinations of the rules and the confidence values can be generated by one iteration, and hence it is possible to shorten the processing time.

SUMMARY

According to an aspect of the invention, a rule learning method for making a computer perform rule learning processing in machine learning includes firstly calculating an evaluation value of respective features in a training example data storage unit storing a plurality of combinations of a training example and a weight of the training example, each example which includes one or more features and a label showing that the example is either true or false, by using data of the training examples and the weights of the training examples, and storing the calculated evaluation value in correspondence with the feature in an evaluation value storage unit; selecting a given number of features in descending order of the evaluation values stored in the evaluation value storage unit; secondly calculating a confidence value for one of the given number of selected features, by using the data and the weights of the training examples in the training example data storage unit, and storing a combination of the confidence value and the one of the selected features in a rule data storage unit; updating the weights stored in the training example data storage unit, by using the data and weights of the training examples, and the confidence value corresponding to the one feature; firstly repeating the updating for the remaining features of the given number of features; and secondly repeating, for a given number of times, the firstly calculating, the selecting, the secondly calculating, the updating, and the firstly repeating.

It is to be understood that both the foregoing general description and the following detailed description are exemplary and explanatory only and are not restrictive of the invention, as claimed.

BRIEF DESCRIPTION OF DRAWINGS

FIG. 3 is an example of a training sample;
FIG. 4 is an example of a score table of the first round;
FIG. 5 is an example of confidence values of the rules (features) selected in the first round;
FIG. 6 is a result of the first weight update processing in the first round;
FIG. 7 is a result of the second weight update processing in the first round;
FIG. 8 is a result of the third weight update processing in the first round;
FIG. 9 is an example of a score table of the second round;
FIG. 12 is an example of a training sample;
FIG. 13 is an example of a score table of the first round;
FIG. 15 is a result of the first weight update processing in the first round;
FIG. 16 is a result of the second weight update processing in the first round;
FIG. 17 is a result of the third weight update processing in the first round;
FIG. 18 is an example of a score table of the second round;
FIG. 19 is a result of the first weight update processing in the second round;
FIG. 20 is a result of the second weight update processing in the second round;
FIG. 21 is a result of the third weight update processing in the second round.

DESCRIPTION OF EMBODIMENTS

Figure 1:
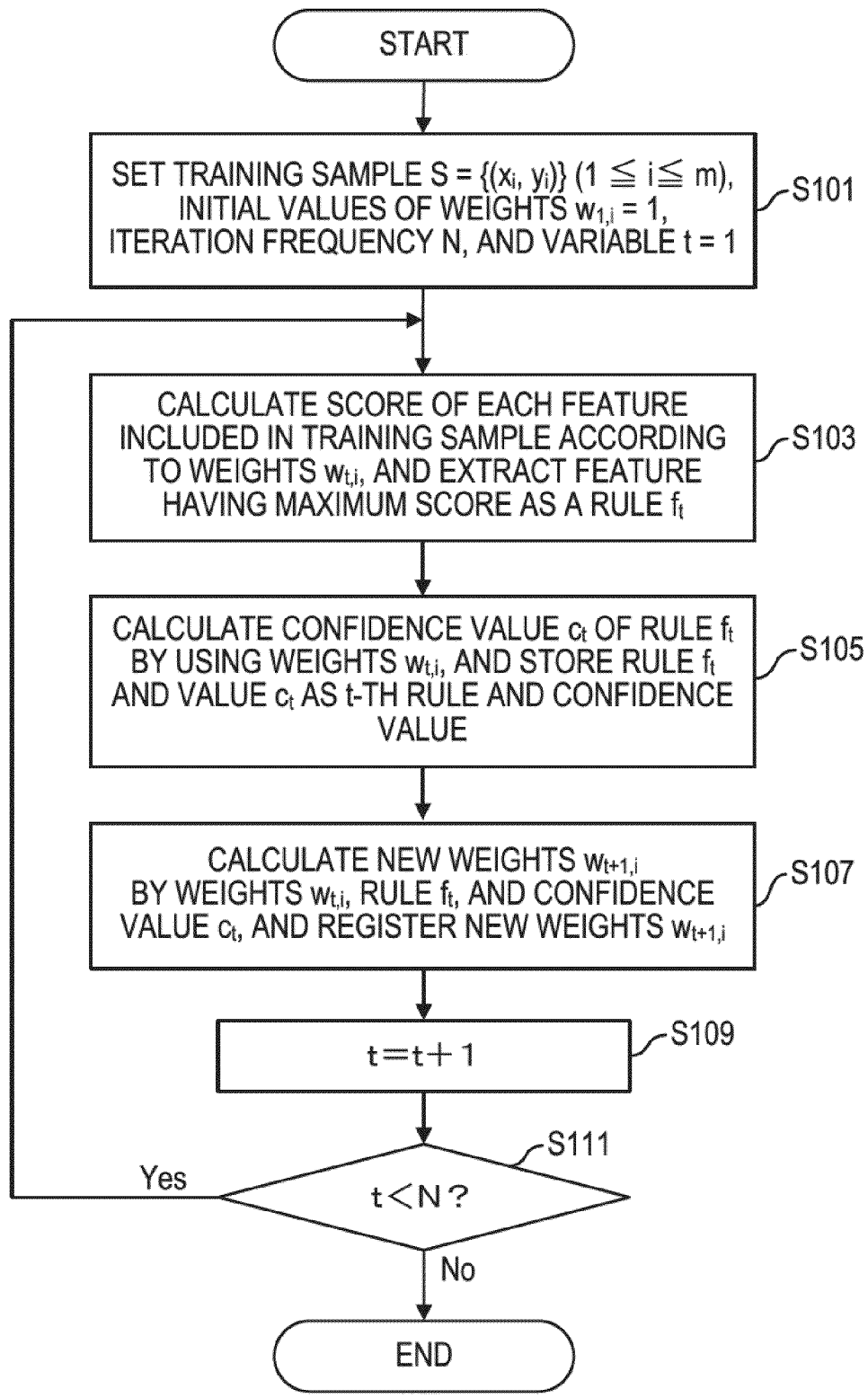
FIG. 1 is a processing flow of a first prior art.
Figure 2:
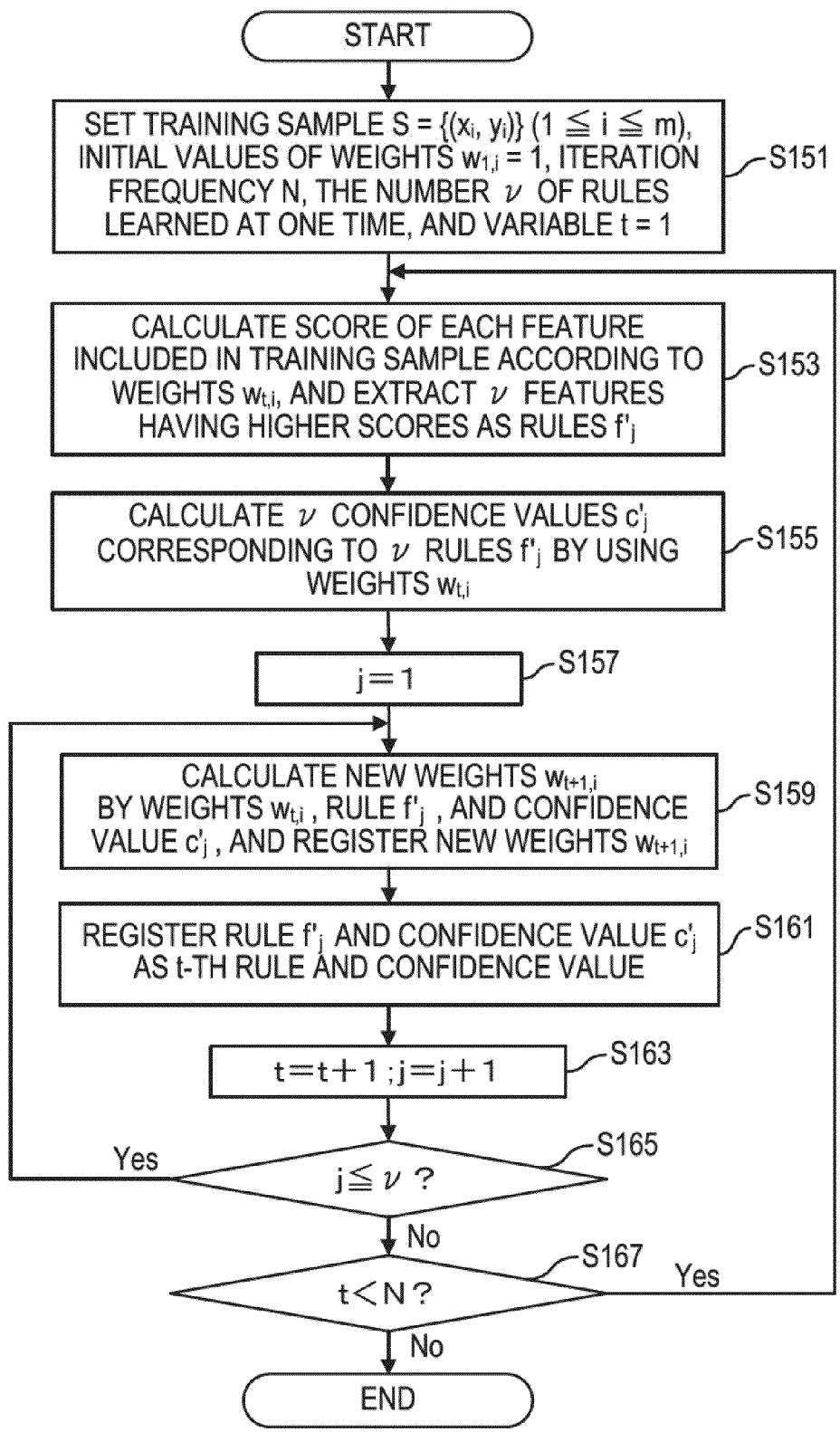
FIG. 2 is a processing flow of a second prior art.

When the processing as illustrated in FIG. 2 is performed, the combinations of the rules and confidence values are more efficiently generated as compared to the case where the processing in FIG. 1 is performed. However, in the processing flow in FIG. 2, when a certain number of rules having higher scores are selected, the confidence values of the selected rules are collectively calculated by using substantially the same weights of the training examples. When such processing is performed, the upper bound of the training error in Boosting may be increased. The upper bound of the training error in Boosting is a function which has a minimum value only at one point. Normally based on a certain weak hypothesis, a confidence value for minimizing the upper bound may be selected by using the weights of the examples at a certain time. However, when the processing, in which confidence values corresponding to a plurality of rules are collectively calculated by using substantially the same weights, is repeatedly performed as in the case of the processing flow in FIG. 2, it is not possible to ensure that the upper bound of the training error is reduced.

An object of the present technique is to perform the rule learning in Boosting at a higher speed, and also to prevent the increase in the upper bound of the training error.

First, there will be described a problem handled by the Boosting algorithm. Here, it is assumed that $\chi$ is a set of examples, and that a set of labels handled is $y=\{-1, +1\}$. Further, an object of learning is to derive a mapping $F: \chi \to y$ from a training sample $S=\{(x1, y1), \ldots, (xm, y1)\}$.

Here, it is assumed that $|x|$ represents types of features included in an example x: $x \in \chi$. It is assumed that the relation: $xi \in \chi$ ($1 \leq i \leq m$) means that a feature-set is configured by features of $|xi|$ types. Further, here, the feature-set which is configured by k features is described as a k-feature-set. Further, the relation: $yi \in y$ means that yi is the class level of the i-th feature-set included in S.

It is assumed that $FT=\{f1, f2, \ldots, fM\}$ represents M types of features to be handled by the Boosting algorithm. Each of the features of the each example xi is expressed as $xi,j \in FT$ ($1 \leq j \leq |xi|$). The present technique is also capable of handling binary vectors. However, in the example described below, it is assumed that each of the features is expressed by a character string.

Further, a case where a certain feature-set includes another feature-set is defined as follows.

Definition 1

In two feature-sets x and x', when x' includes all the features included in x, x is referred to as a subset of the feature-set x', and is described as $x \subset x'$.

Further, in the present embodiment, rules are defined on the basis of the theory of real-valued predictions and abstaining (RVPA) which is explained in the document (R. E. Schapire and Y. Singer, "Boostexter: A boosting-based system for text categorization", Machine Learning, 39(2/3): 135-168, 2000) as described in the section of the background art. In the RVPA, when a feature-set of an input matches a condition, a confidence value expressed by a real number is returned. When the feature-set of the input does not match with the condition, "0" is returned. A weak hypothesis for classifying a feature-set is defined as follows.

Definition 2

When it is assumed that a feature-set f is a rule, and that x is a feature-set of an input, and further when it is assumed that a real number c is a confidence value of the rule f, the application of the rule is defined as follows.

[Formula 1]

$$h_{(f,c)}(x) = \begin{cases} c & f \subseteq x \\ 0 & \text{otherwise} \end{cases}$$

The rule learning based on Boosting is to acquire combinations between T types of rule feature-sets and confidence values of the rule feature-sets ($<f1, c1>, \ldots, <fT, cT>$) by learning in T times of Boosting rounds with a weak learner, so as to construct F defined as follows.

[Formula 2]

$$F(x) = \text{sign}\left(\sum_{t=1}^{T} h_{(f_t, c_t)}(x)\right)$$

Note that sign(x) expresses a function which takes a value of 1 when x is 0 or more, or otherwise takes a value of -1.

The weak learner derives a rule ft and a confidence value ct of the rule ft by using the training sample $S\{(xi, yi)\}$ ($1 \leq i \leq m$) and weights $\{wt, 1, \ldots wt, m\}$ of the respective training examples at the time of the t-th Boosting round. The expression wt,i (0<wt,i) denotes a weight of the i-th example (xi, yi) ($1 < i \leq m$) in the t-th Boosting round ($1 \leq t \leq T$).

Based on the given training sample and the weights of the training examples, the weak learner selects, as a rule, a feature-set f which minimizes the following formula, and the confidence value c of the feature-set f.

[Formula 3]

$$\sum_{y \in \{-1,+1\}} W_{t,y}(f) * \exp(-y * h_{(f,c)}(x_t)) + W_t(\neg f) \quad (1)$$

$$W_{t,y}(f) = \sum_{l=1}^{m} w_{t,i}[[f \subseteq x_l \wedge y_t = y]]$$

$$W_t(\neg f) = \sum_{l=1}^{m} w_{t,i} - W_{t,+1}(f) - W_{t,-1}(f)$$

Note that $[[\pi]]$ is 1 if a proposition $\pi$ holds and 0 otherwise.

The reason why equation (1) in Formula 3 is used as a reference for selecting the rule is because the upper bound of the training error of the learning algorithm based on Boosting relates to the sum of the weights of the examples.

When equation (1) in Formula 3 is minimized by a certain rule f, the confidence value c at this time is expressed as follows.

[Formula 4]

$$c = \frac{1}{2}\ln\left(\frac{W_{t,+1}(f)}{W_{t,-1}(f)}\right) \quad (2)$$

The following formula is obtained by substituting equation (2) in Formula 4 into Formula (1).

[Formula 5]

$$\sum_{i=1}^{m} w_{i,t} - \left(\sqrt{W_{t,+1}(f)} - \sqrt{W_{t,-1}(f)}\right)^2 \quad (3)$$

It may be seen from equation (3) in Formula 5 that minimizing equation (1) in Formula 3 is equivalent to selecting a feature-set f which maximizes a score defined by the following formula.

[Formula 6]

$$\text{score}(f) \stackrel{\text{def}}{=} \left|\sqrt{W_{t,+1}(f)} - \sqrt{W_{t,-1}(f)}\right| \quad (4)$$

The weights of the respective examples are updated by (ft, ct). Note that there are cases where the weights are normalized so that the total sum of the weights becomes 1, and cases where the weights are not normalized. When normalization is performed, the weight $w_{t+1,i}$ in the (t+1)th round is defined as follows.

[Formula 7]

$$w_{i+1,t} = \frac{w_{t,i}\exp(-y_i h_{(f_t,c_t)}(x_i))}{Z_t} \quad (5)$$

$$Z_t = \sum_{i=1}^{m} w_{t,i}\exp(-y_i h_{(f_t,c_t)}(x_i))$$

When normalization is not performed, the weight $w_{t+1,i}$ in the (t+1)th round is defined as follows.

[Formula 8]

$$W_{t+1,i} = W_{t,i}\exp(-y_i h_{(f_t,c_t)}(\chi_i)) \quad (6)$$

Note that it is assumed that when the normalization is performed, the initial values $w_{1,i}$ of the weights are set to 1/m (where m is the number of training examples), and that when the normalization is not performed, the initial values $w_{1,i}$ of the weights are set to 1.

Further, when the features seldom appear (that is, where features appear in only few examples), there may arise a case where the value of $w_{t,+1}(f)$ or $W_{t,-1}(f)$ becomes a very small value or 0. In order to avoid this, a value $\epsilon$ for smoothing is introduced.

That is, equation (2) in Formula 4 is transformed as follows.

[Formula 9]

$$c = \frac{1}{2}\ln\left(\frac{W_{t,+1}(f)+\varepsilon}{W_{t,-1}(f)+\varepsilon}\right) \quad (7)$$

For example, $\epsilon=1/m$ or $\epsilon=1$ is used.

Figure 10:
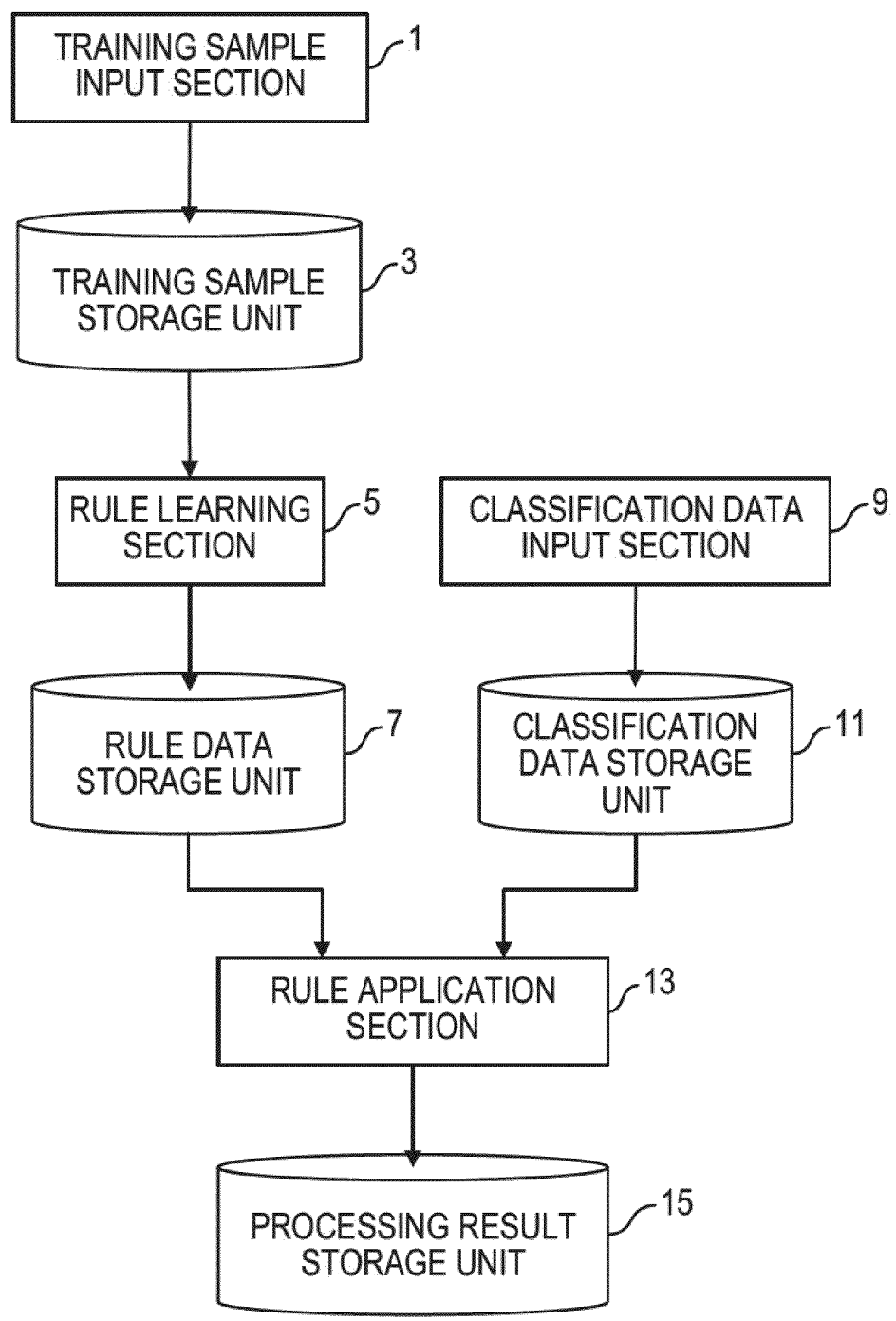
FIG. 10 is a functional block diagram of a system in an embodiment of the present technique.

An embodiment of the present technique is described on the basis of the premise as described above. FIG. 10 shows a functional block diagram of a system in the present embodiment. The present system includes: a training sample input section 1 configured to perform input of a training sample, and the like; a training sample storage unit 3 configured to store the training sample, and the like, inputted by the training sample input section 1; a rule learning section 5 configured to perform main processing in the present embodiment by using data stored in the training sample storage unit 3; a rule data storage unit 7 configured to store rule data which are the results of processing in the rule learning section 5; a classification data input section 9 configured to perform input of classification data which is an object to be classified by applying the generated rules; a classification data storage unit 11 configured to store the classification data inputted by the classification data input section 9; a rule application section 13 configured to perform classification by applying the rule data stored in the rule data storage unit 7 to the processing object data stored in the classification data storage unit 11; and a processing result storage unit 15 configured to store the result of processing in the rule application section 13. Note that it is the rule application section 13 that performs the mapping F: $\chi \rightarrow y$, which is described in the present technique, and in which $\chi$ represents the classification data and y represents the processing result. In this way, the processing contents of the rule application section 13 are substantially the same as the processing contents of conventional processing. When the rule data is prepared to be stored in the rule data storage unit 7, and when the classification data is prepared to be stored in the classification data storage unit 11 by the classification data input section 9, the processing is performed in the conventional manner, and the processing results are also similarly stored. Therefore, in the following, the explanation of such processing contents is omitted.

FIG. 11 to FIG. 21 illustrate the processing of the rule learning in the present embodiment.

First, for example, according to an instruction from a user, the training sample input section 1 receives inputs of: a training sample S={(x1, y1), (x2, y2), ..., (xm, ym)} including m examples, each of which is a combination of a feature-set xi that includes one or more features with a label yi that is either −1 or +1; initial values $w_{1,i}=1$ ($1 \leq i \leq m$) of m weights corresponding to the m examples; an iteration frequency N; the number v of rules learned at one time; and a variable t=1 for counting the iteration frequency. The training sample input section 1 stores the received inputs in the training sample storage unit 3 (at S1). In order to facilitate understanding, an example is described in which a training sample as illustrated in FIG. 12 is processed. In FIG. 12, three training examples are included. The first training example includes a feature-set in which features of a, b, and c are included, and the label is +1. The weight of the first training example is 1. The second training example includes a feature-set in which features of a, b, c, and d are included, and the label is −1. The weight of the second training example is 1. The third training example includes a feature-set in which features of a, b, and d are included, and the label is +1. The weight of the third training example is 1.

The rule learning section 5 performs rule extracting processing by using the data stored in the training sample storage unit 3 (at S3). Next, the rule extracting processing is described with reference to FIG. 14.

First, the rule learning section 5 extracts an unprocessed feature included in the training sample S as a rule candidate (at S21). For example, the rule learning section 5 extracts a feature a in the example illustrated in FIG. 12. Then, the rule learning section 5 calculates the score relating to the rule candidate by using the training sample S and the weights $w_{t,i}$, and registers the calculated score in a score table provided in a storage apparatus such as, for example, a main memory (at S23). The calculation of the score is performed by using equation (4) in Formula 6 as described above. The calculation of equation (4) in Formula 6 is performed by using the definition formula of Wt,y (f) shown in equation (1) in Formula 3.

In order to calculate the score of the feature a in the example illustrated in FIG. 12, the following calculation is performed.

$$W1,+1(a)=1\times[[a \subseteq (a\ b\ c) \wedge (+1)=(+1)]]+1\times[[a \subseteq (a\ b\ c\ d) \wedge (-1)\neq (\overline{+1})]]+1\times[[a \subseteq (a\ b\ d) \wedge (+1)=(\overline{+1})]]= 1+0+1=2, \text{ and}$$

$$W1,-1(a)=1\times[[a \subseteq (a\ b\ c) \wedge (-1)\neq (+1)]]+1\times[[a \subseteq (a\ b\ c\ d) \wedge (-1)=(\overline{-1})]]+1\times[[a \subseteq (a\ b\ d) \wedge (-1)\neq (\overline{+1})]]= 0+1+0=1$$

Therefore, the score of the feature a is calculated as |sqrt(2)-sqrt(1)|=0.414, where sqrt(x) is the radical sign of x.

Then, the rule learning section 5 determines whether or not all the features are processed (at S25). When an unprocessed feature exists, the rule learning section 5 returns to S21. In the example described above, when such processing is repeated, the scores of the features a, b, c, and d are calculated, and a score table as illustrated in FIG. 13 is obtained.

On the other hand, when no unprocessed feature exists, the rule learning section 5 sorts the records of the score table in the descending order of the scores, and selects v features (rule candidates) having higher scores as rules f'j ($1 \leq j \leq v$) (S27). Then, the rule learning section 5 returns to the original processing. For example, in the case of the score table as illustrated in FIG. 13, when v is set as v=3, the features a, b, and c are selected as the rules.

Returning to the explanation of the processing in FIG. 12, the rule learning section 5 initializes j to 1 (at S5). Then, the rule learning section 5 calculates one confidence value c'j corresponding to one rule f'j by using the weights wt,i ($1 \leq i \leq m$), and stores the calculated confidence value c'j in a storage apparatus such as, for example, a main memory (at S7). The rule learning section 5 calculates the confidence value c'j according to equation (7) in Formula 9. For example, it is assumed that $\epsilon=1/m$ (where m is the number of training examples)=1/3. In the case of the feature a, the rule learning section 5 calculates the confidence value as c'1=0.5 ln ((2+1/3)/(1+1/3))=0.279, where ln(x) means the log value of x.

In the present embodiment, unlike the prior art, the rule learning section 5 calculates one confidence value c'j for one rule f'j by using the present weights wt,i . . . .

Then, the rule learning section 5 calculates new weights wt+1,i by using the weights wt,i, the rule f'j, and the confidence value c'j, and registers the weights wt+1,i in the training sample storage unit 3 to update the weights wt,i (at S9).

For example, as illustrated in FIG. 15, the weight of the first training example is updated to "0.75" and registered, and the weight of the second training example is updated to "1.32" and registered. Also, the weight of the third training example is updated to "0.75" and registered.

Then, the rule learning section 5 registers the rule f'j and the confidence value c'j in the rule data storage unit 7 as the t-th rule and confidence value (at S11).

Thereafter, the rule learning section 5 increments both t and j by one, (at S13). Then, the rule learning section 5 determines whether or not j is equal to or less than v (at S15). When j is equal to or less than v, the rule learning section 5 returns to S7, and performs the processing for the next rule f'j.

In this way, in the present embodiment, each time the rule learning section 5 calculates the confidence value c'j corresponding to the rule f'j, the rule learning section 5 updates the weights wt,i, and thereby prevents the upper bound of the training error from being increased.

In the example described above, the rule learning section 5 returns to S7 and performs the processing of the feature b, so that the confidence value c of the feature b is calculated to be 0.054. When the rule learning section 5 calculates the weights wt+1,i to be used in the next calculation, by using the confidence value c and the weights wt,i illustrated in FIG. 15, the weights wt+1,i as illustrated in FIG. 16 are obtained. In the section of the background art, there is the example in which the learning processing is performed to substantially the same training examples S as those illustrated in FIG. 12. The processing results illustrated in FIG. 3, FIG. 4, and FIG. 6 are substantially the same as the processing results illustrated in FIG. 12, FIG. 13, and FIG. 15. However, the results illustrated in FIG. 7, which are the results of the weight calculation, are different from the results illustrated in FIG. 16 in the present example.

Further, in the above described example, the rule learning section 5 returns to S7 and performs the processing of the feature c, so that the confidence value c of the feature c is calculated to be −0.249. When the rule learning section 5 calculates the weights wt+1,i to be used in the next calculation, by using the confidence value c and the weights wt,i as illustrated in FIG. 16, the weights wt+1,i as illustrated in FIG. 17 are obtained. Similarly to the case of FIG. 16, it may be seen that results are obtained which are different from the results of FIG. 8 as described in the section of the background art.

On the other hand, when j exceeds v, the rule learning section 5 determines whether or not t is smaller than N (at S17). When t is smaller than N, the rule learning section 5 returns to the process of S3. On the other hand, when t is equal to or more than N, the rule learning section 5 ends.

In the above described example, when the rule learning section 5 returns to S3 and again calculates the scores of the features a, b, c, and d, the results as illustrated in FIG. 18 are obtained. Since the features of the top three scores are selected, the features a, b, and c are selected in the example illustrated in FIG. 18. Note that in the case of the background art, since the results as illustrated in FIG. 9 are obtained, the features of c, d, and a (or b) are selected which are different from the features selected in the example illustrated in FIG. 18.

When the weights wt,i illustrated in FIG. 17 are used, the confidence value c of the feature a is calculated to be 0.16. When the confidence value c and the weights wt,i illustrated in FIG. 17 are used, the weights wt+1,i to be used in the next calculation are obtained as illustrated in FIG. 19.

Next, when the confidence value c of the feature b is calculated by using the weights wt,i as illustrated in FIG. 19, a confidence value c of 0.032 is obtained. When the value of the confidence value c and the weights wt,i illustrated in FIG. 19 are used, the weights wt+1,i to be used in the next calculation are obtained as illustrated in FIG. 20.

Further, when the confidence value c of the feature d is calculated by using the weights wt,i as illustrated in FIG. 20, a confidence value c of −0.29 is obtained. When the value of the confidence value c and the weights wt,i illustrated in FIG. 20 are used, the weights wt+1,i to be used in the next calculation are obtained as illustrated in FIG. 21.

Convergency of AdaBoost in BoosTexter is described as below.

First, there will be described the upper bound of the training error of AdaBoost which is proved in Theorem 1 of the document (R. E. Schapire and Y. Singer, "Improved boosting using confidence-rated predictions", Machine Learning, 37(3): 297-336, 1999), the document which is described in the background art. The AdaBoost described in this document is the normalization of weights, and is hereinafter referred to as AdaBoost-normalized. The upper bound of the training error becomes a product of the weights of the examples in each round as explained in the document. Subsequently, even when any rule is added, the upper bound of the training error becomes smaller than or equal to the upper bound of the training error of the previous round.

First, the upper bound of the training error of F, which is configured by T rules derived on the basis of AdaBoost as proposed in the above described document, is expressed as follows.

[Formula 10]

$$\frac{1}{m}\sum_{i=1}^{m} [[F(x_I) \neq y_I]] \leq \prod_{t=1}^{T} Z_t$$

First, there will be described the upper bound of the training error.

When the weights are set as w1/i=1/m, equation (8) in Formula 11 obtained by developing equation (5) in Formula 7 expressing the weight update rule.

[Formula 11]

$$w_{T+1,i} = \frac{\exp\left(-y_i \sum_{t=1}^{T} h_{(f_t,c_t)}(x_i)\right)}{m \prod_{t=1}^{T} Z_t} \quad (8)$$

Further, when F(xi)≠yi, the following formula is obtained.

[Formula 12]

$$F(x_I)y_t = \text{sign}\left(\sum_{t=1}^{T} h_{(f_t,c_t)}(x_i)\right) y_t < 0$$

Thus, the following formula is obtained.

[Formula 13]

$$\exp\left(-y_t \sum_{t=1}^{T} h_{(f_t,c_t)}(x_I)\right) \geq 1$$

As a result, the following formula is obtained.

[Formula 14]

$$[[F(x_i) \neq y_i]] \leq \exp\left(-y_i \sum_{i=1}^{T} h_{(f_t,c_t)}(x_i)\right) \quad (9)$$

Therefore, from equation (8) in Formula 11 and equation (9) in, Formula 14 the above described upper bound of the training error is obtained as follows.

[Formula 15]

$$\frac{1}{m}\sum_{i=1}^{m} [[F(x_i) \neq y_i]] \leq \frac{1}{m}\sum_{i=1}^{m} \exp\left(-y_i \sum_{t=1}^{T} h_{(f_t,c_t)}(x_i)\right)$$

$$= \sum_{i=1}^{m} \left(\prod_{t=1}^{T} Z_t\right) w_{T+1,i}$$

$$= \prod_{t=1}^{T} Z_t$$

Subsequently, when a new rule is added to (T−1) rules derived by AdaBoost-normalized, even when any rule is added, the upper bounds of the training error, which are obtained respectively from the (T−1) rules and the T rules, have the following relation.

[Formula 16]

$$\prod_{t=1}^{T} Z_t \leq \prod_{t=1}^{T-1} Z_t$$

First, the upper bound of the training error obtained from the T rules is rewritten as follows.

[Formula 17]

$$\prod_{t=1}^{T} Z_t = \left(\prod_{t=1}^{T-1} Z_t\right) Z_T \quad (10)$$

Here, when ZT is rewritten on the basis of definition 2, the following formula is obtained.

[Formula 18]

$$Z_T = \sum_{i=1}^{m} w_{T,i} \exp(-y_i h_{(f_T,c_T)}(x_i))$$

$$= W_T(\neg f_T) + W_{T,+1}(f_T)\exp(-c_T) + W_{T,-1}(f_T)\exp(c_T)$$

Here, WT−1(¬f) is expressed as follows.

[Formula 19]

$$W_T(\neg f) = \sum_{i=1}^{m} w_{T,i} - W_{T,+1}(f) - W_{T,-1}(f)$$

Thus, the following formula is obtained.

[Formula 20]

$$c_T = \frac{1}{2}\ln\left(\frac{W_{T,+1}(f_T)}{W_{T,-1}(f_T)}\right)$$

By this formula, ZT is eventually rewritten as follows.

[Formula 21]

$$Z_T = W_T(\neg f_T) + W_{T,+1}(f_T)\exp(-c_T) + W_{T,-1}(f_T)\exp(c_T)$$
$$= \sum_{i=1}^{m} w_{T,i} - W_{T,+1}(f_T) - W_{T,-1}(f_T) +$$
$$W_{T,+1}(f_T)\exp(-c_T) + W_{T,-1}(f_T)\exp(c_T)$$
$$= \sum_{i=1}^{m} w_{T,i} - W_{T,+1}(f_T) - W_{T,-1}(f_T) + 2\sqrt{W_{T,+1}(f_T)W_{T,-1}(f_T)}$$
$$= \sum_{i=1}^{m} w_{T,i} - \left(\sqrt{W_{T,+1}(f_T)} - \sqrt{W_{T,-1}(f_T)}\right)^2$$

Note that in AdaBoost-normalized, the total sum of the (t−1)th weights is 1, and hence the following formula is obtained.

[Formula 22]

$$Z_T = 1 - (\sqrt{W_{T,+1}(f_T)} - \sqrt{W_{T,-1}(f_T)})^2 \leq 1 \quad (11)$$

From equation (10) in Formula 17 and equation (11) in Formula 22, as described above, the following relation is obtained.

[Formula 23]

$$\prod_{t=1}^{T} Z_t = \left(\prod_{t=1}^{T-1} Z_t\right) Z_t$$
$$= \left(\prod_{t=1}^{T-1} Z_t\right)\left(1 - \left(\sqrt{W_{T,+1}(f_T)} - \sqrt{W_{T,-1}(f_T)}\right)^2\right)$$
$$\leq \left(\prod_{t=1}^{T-1} Z_t\right)$$

Therefore, even when any rule is added, the upper bound of the training error becomes smaller than or equal to the upper bound of the training error of the previous round.

There is another kind of AdaBoost, which is AdaBoost in the AdaTrees learning algorithm. It is described in the document (Y. Freund and L. Mason, "The alternating decision tree learning algorithm", In Proc. of 16th ICML, pages 124-133, 1999) which is introduced in the background art.

AdaBoost in the AdaTrees learing algorithm does not normalize the weights. Therefore the AdaBoost in the AdaTrees learning algorithm is hereinafter referred to as AdaBoost-unnormalized. The upper bound of the training error of AdaBoost-unnormalized becomes the sum of the weights of the examples, the weights of which are updated in each round. This is derived on the basis of Theorem 1 of the document (R. E. Schapire and Y. Singer. Boostexter: A boosting-based system for text categorization. Machine Learning, 39(2/3):135-168, 2000). Further in AdaBoost used in the AdaTrees learning algorithm, even when any rule is added, the upper bound of the training error becomes smaller than, or at worst equal to the upper bound of the training error of the previous round.

First, F, which is configured by T rules derived by AdaBoost used in the Adatrees learning algorithm, includes the upper bound of the training error, which is expressed as follows.

[Formula 24]

$$\sum_{i=1}^{m} [[F(x_t) \neq y_t]] \leq Z'_T$$

Here, the following formula is used.

[Formula 25]

$$Z'_T = \sum_{i=1}^{m} w_{T+1,i}$$

Equation (12) in Formula 26 is obtained by developing equation (6) in Formula 8 which is the weight update rule.

[Formula 26]

$$w_{T+1,i} = \exp\left(-y_i \sum_{t=1}^{T} h_{(f_t,c_t)}(x_i)\right) \quad (12)$$

Further, when F(xi)≠yi, the following relation is established.

[Formula 27]

$$F(x_l)y_t = \text{sign}\left(\sum_{t=1}^{T} h_{(f_t,c_t)}(x_l)\right) y_i < 0$$

Thus, the following formula is obtained.

[Formula 28]

$$\exp\left(-y_t \sum_{t=1}^{T} h_{(f_t,c_t)}(x_l)\right) \geq 1$$

As a result, the following formula is obtained.

[Formula 29]

$$[[F(x_i) \neq y_i]] \leq \exp\left(-y_i \sum_{t=1}^{T} h_{(f_t,c_t)}(x_i)\right) \quad (13)$$

Therefore, the upper bound of the training error is obtained from equation (12) in Formula 26 and equation (13) in Formula 29 as follows.

[Formula 30]

$$\sum_{i=1}^{m} [[F(x_i) \neq y_i]] \leq \sum_{i=1}^{m} \exp\left(-y_i \sum_{i=1}^{T} h_{(f_t, c_t)}(x_i)\right)$$
$$= \sum_{i=1}^{m} w_{T+1, 1}$$
$$= Z'_T$$

Subsequently when a new rule is added to the (T−1) rules derived by AdaBoost used in the AdaTrees learning algorithm, even when any rule is added, the upper bound of the training error, which is obtained from the (T−1) rules, and the upper bound of the training error, which is obtained from T rules, have a relationship of Z'T≦Z'T−1.

From definition 2, the upper bound of the training error obtained from T rules is rewritten as follows.

[Formula 31]

$$Z'_T = \sum_{i=1}^{m} w_{T+1, i}$$
$$= \sum_{i=1}^{m} w_{T, i} \exp(-y_i h_{(f_T, c_T)}(x_i))$$
$$= W_T(\neg f) + W_{T, +1}(f_T) \exp(-c_T) + W_{T, -1}(f_T) \exp(c_T)$$

Here, the following formula is used.

[Formula 32]

$$W_T(\neg f) = \sum_{i=1}^{m} w_{T, i} - W_{T, +1}(f) - W_{T, -1}(f)$$

Then, the following formula is obtained.

[Formula 33]

$$c_T = \frac{1}{2} \ln\left(\frac{W_{T, +1}(f_T)}{W_{T, -1}(f_T)}\right)$$

From this formula, the following relationship is obtained for the upper bound of the training error, which is obtained from the T rules.

[Formula 34]

$$Z'_T = W_T(\neg f_T) + W_{T, +1}(f_T) \exp(-c_T) + W_{T, -1}(f_T) \exp(c_T) \quad (14)$$
$$= \sum_{i=1}^{m} w_{T, i} - W_{T, +1}(f_T) - W_{T, -1}(f_T) + W_{T, +1}(f_T) \exp(-c_T) + W_{T, -1}(f_T) \exp(c_T)$$
$$= \sum_{i=1}^{m} w_{T, i} - W_{T, +1}(f_T) - W_{T, -1}(f_T) + 2\sqrt{W_{T, +1}(f_T) W_{T, -1}(f_T)}$$
$$= \sum_{i=1}^{m} w_{T, i} - \left(\sqrt{W_{T, +1}(f_T)} - \sqrt{W_{T, -1}(f_T)}\right)^2$$
$$= Z'_{T-1} - \left(\sqrt{W_{T, +1}(f_T)} - \sqrt{W_{T, -1}(f_T)}\right)^2 \leq Z'_{T-1}.$$

Therefore, even when any rule is added, the upper bound of the training error becomes smaller than or equal to the upper bound of the training error of the previous round.

By performing the above described processing, the combinations of the rules and the confidence values are registered in the rule data storage section 7, and substantially the same classification processing as the conventional classification processing is performed by the rule application section 13.

Figure 11:
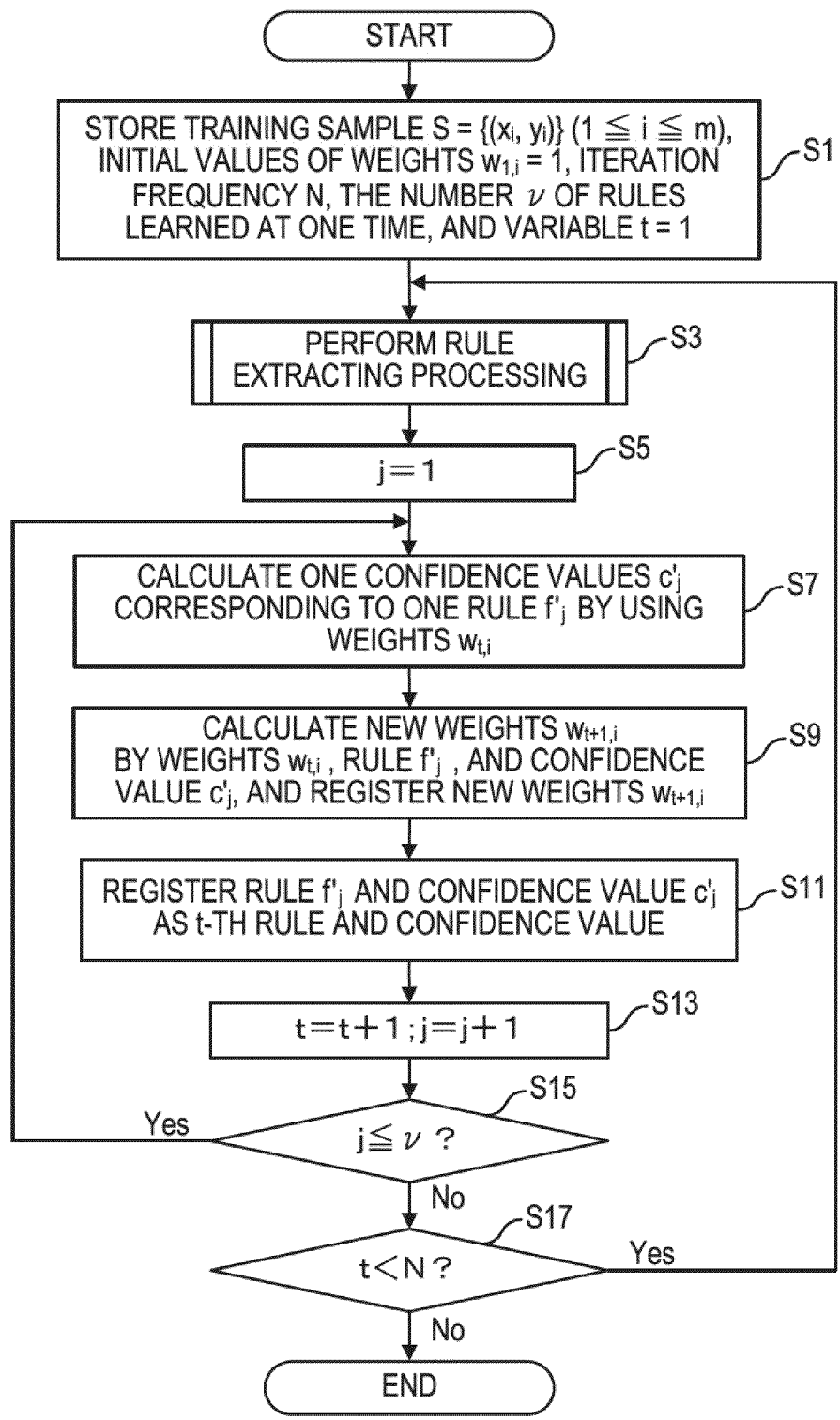
FIG. 11 is a main processing flow of the present technique.
Figure 14:
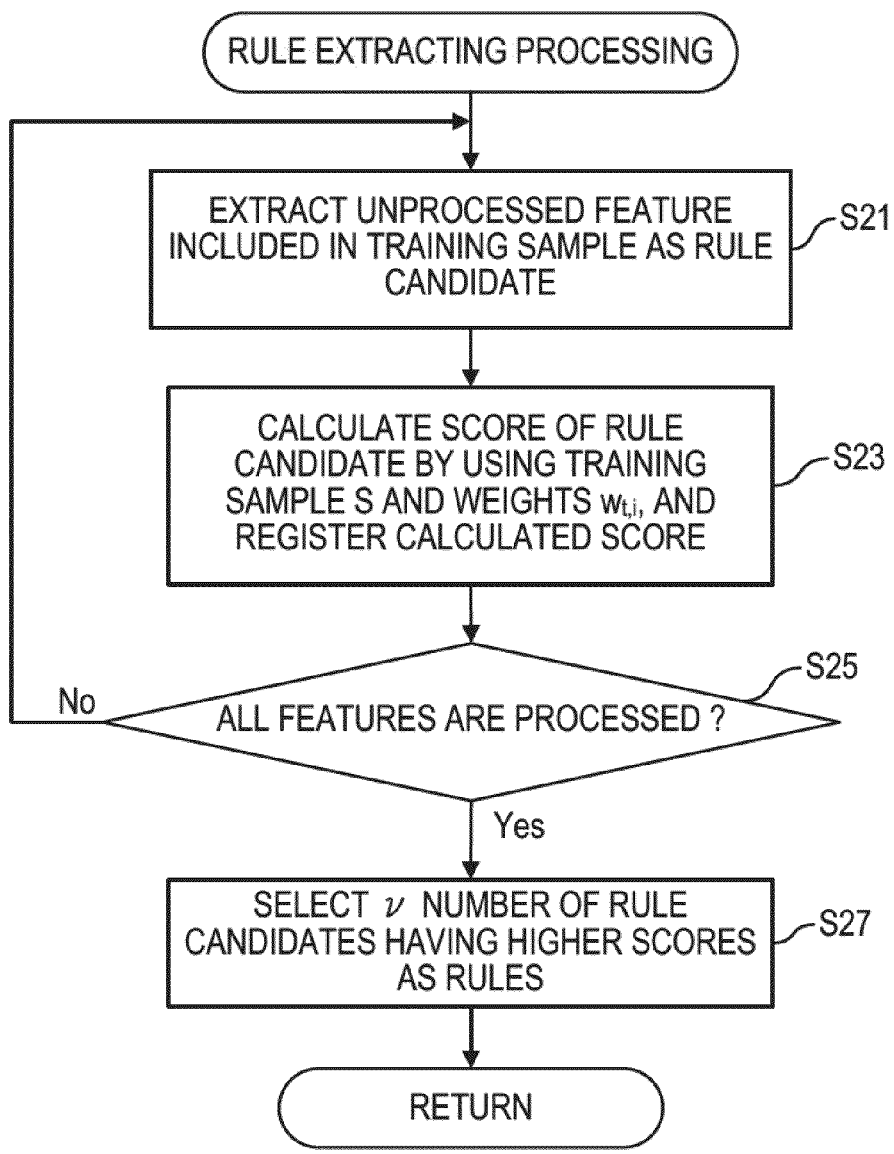
FIG. 14 is a processing flow of rule extracting processing.
Figure 22:
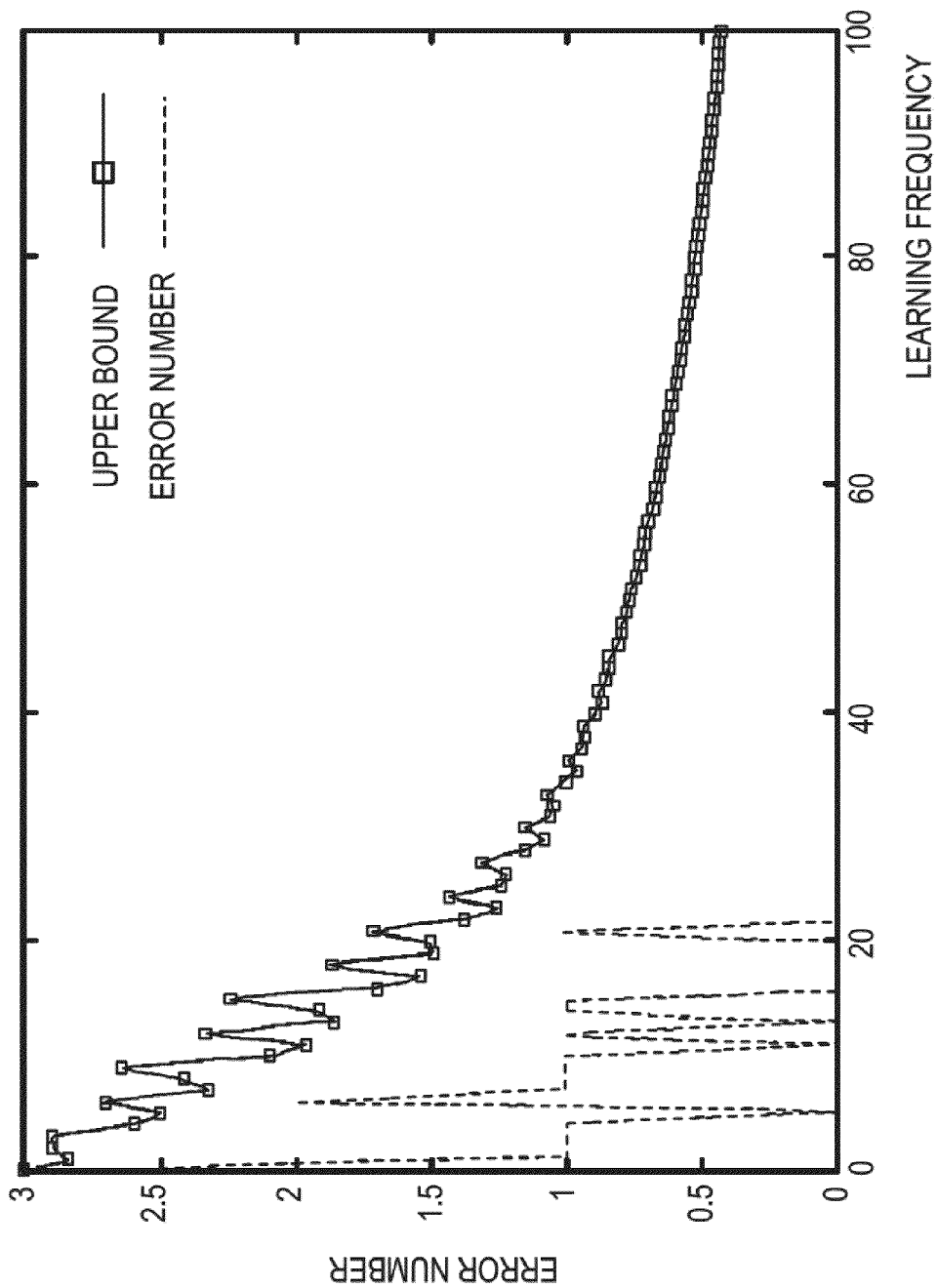
FIG. 22 is an example of relationships of the error number and the upper bound of the training error with the learning frequency when the processing flow of prior art is adopted.
Figure 23:
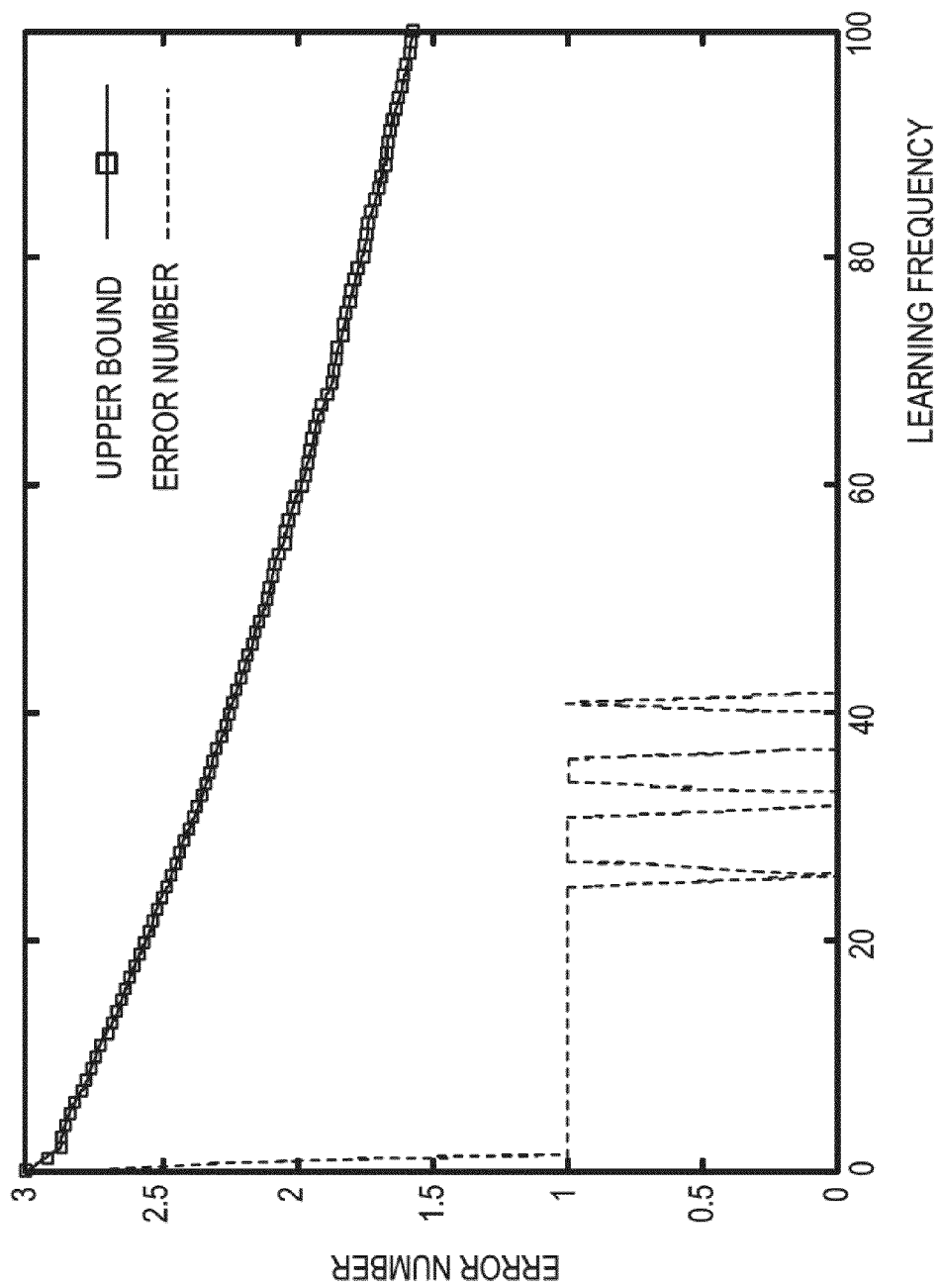
FIG. 23 is a second example of relationships of the error number and the upper bound of the training error with the learning frequency when the processing flow of prior art is adopted.
Figure 24:
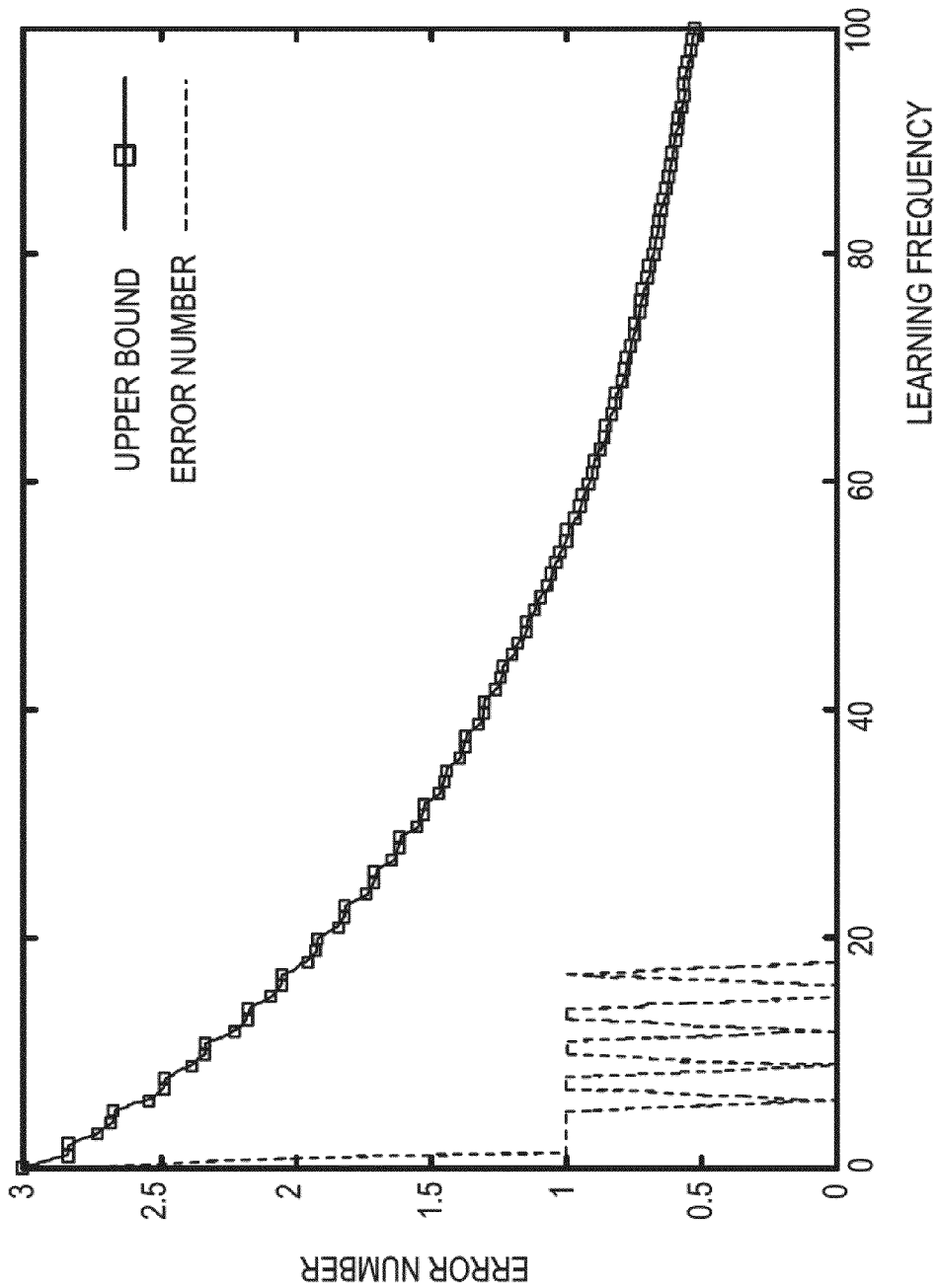
FIG. 24 is an example of relationships of the error number and the upper bound of the training error with the learning frequency when the processing flow of the present embodiment is adopted.

Here, there is discussed the effect when, for the training sample in FIG. 12, three rules are learned in each round (that is, each time when S3 is performed in the processing flow in FIG. 11). FIG. 22 represents the relationship of the upper bound of the training error and the error number with the learning frequency when the learning is performed by using the processing flow in FIG. 2 and using equation (2) in Formula 4 of the confidence value. In the graph in FIG. 22, the horizontal axis represents the learning frequency, and the vertical axis represents the error number. As illustrated in FIG. 22, the error number fluctuates so as not to be stably reduced, and the upper bound of the training error may also be increased. This indicates the problem as described above. Further, FIG. 23 represents the relationship of the upper bound of the training error and the error number with the learning frequency when the learning is performed by using the processing flow in FIG. 2 and equation (7) in Formula 9 of the confidence value, in which equation (7) in Formula 9 $\epsilon$ is set as $\epsilon = 1/m$ (where m is the number of rules learned at one time and is set to 3). In the graph in FIG. 23, the horizontal axis represents the learning frequency, and the vertical axis represents the error number. In the case of FIG. 23, it is seen that the upper bound of the training error does not increase, but that the number of errors is slowly reduced. On the other hand, FIG. 24 represents the relationship of the upper bound of the training error and the error number with the learning frequency when the method according to the present embodiment is adopted. In the graph in FIG. 24, the horizontal axis represents the learning frequency, and the vertical axis represents the error number. In the case of FIG. 24, it may be seen that the upper bound of the training error does not increase, and as in the rate of decrease in the error number, the rate of decrease in the upper bound of the training error is higher than the case of FIG. 22. That is, it may be seen that the upper bound of the training error may be converged at high speed without causing a problem.

Figure 25:
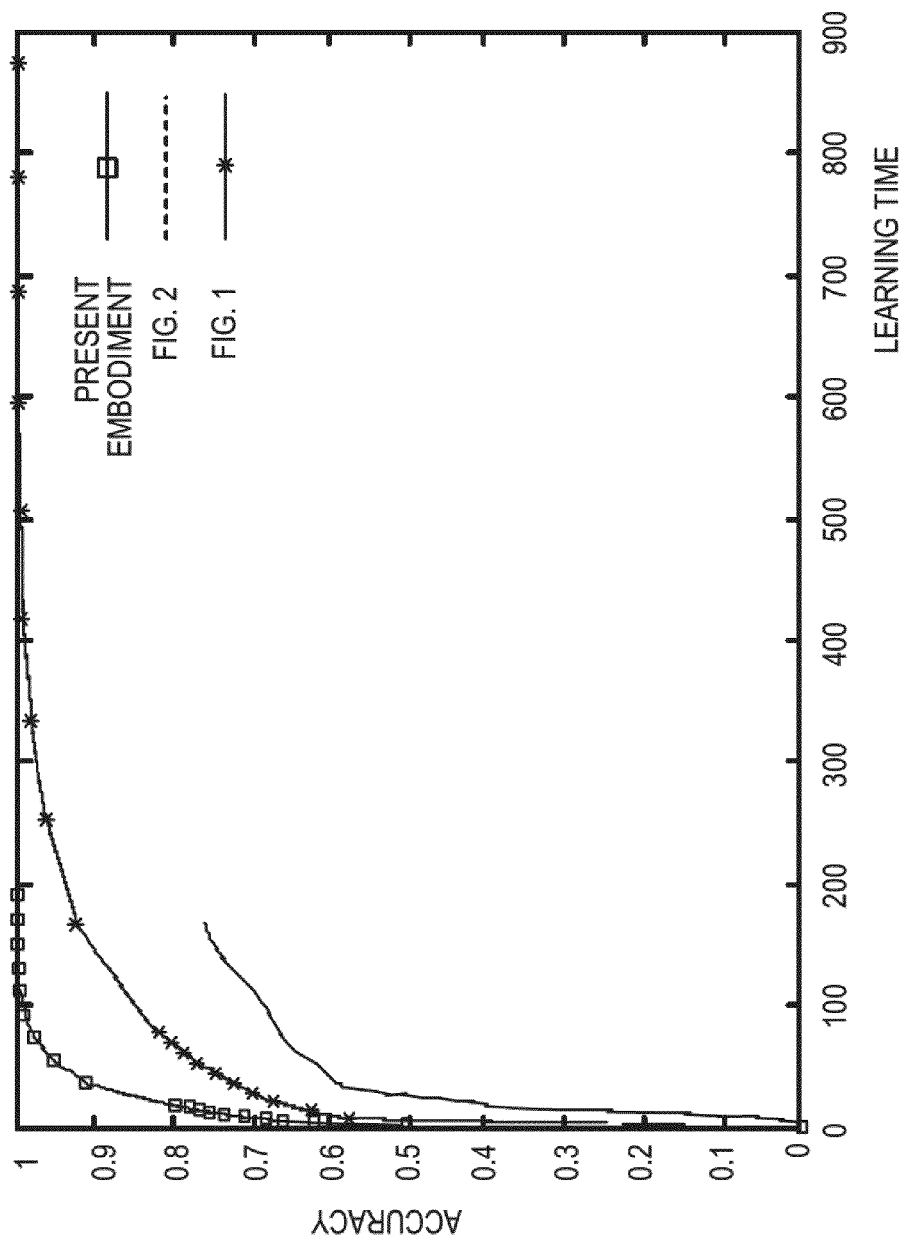
FIG. 25 is an example of an experiment on the relationship between the learning time and the accuracy (when the processing flows of FIG. 1, FIG. 2, and the present embodiment are adopted)

Further, by using a training sample in which 1340 words are proper nouns among 12821 words, and which is prepared for the proper noun discrimination, the degree of accuracy of discrimination of the proper nouns for the training sample is measured for each learning time, and the measurement results are depicted in FIG. 25. In the graph in FIG. 25, the horizontal axis represents the learning time, and the vertical axis represents the accuracy. The accuracy F is calculated by the following formula.

$$F=2*\text{Recall}*\text{Precision}/(\text{Recall}+\text{Precision})$$

Recall=the number of correctly distinguished proper nouns/the number of proper nouns Precision=the number of correctly distinguished proper nouns/the number of proper nouns responded to It can be clearly seen that the accuracy may be more rapidly improved by adopting the processing flow of FIG. 2 rather than the processing flow of FIG. 1, and that the accuracy may be more rapidly improved by adopting the processing flow of the present embodiment rather than the processing flow of FIG. 2. In this way, the present embodiment is not only simple in structure, but also it can be seen that the processing flow according to the present embodiment improves the learning speed in comparison to the processing flow in FIG. 2.

As described above, an embodiment according to the present technique has been described, but the present technique is not limited to this. For example, the functional block diagram in FIG. 10 is an example, and the program module is not necessarily configured as described above.

Further, the present technique may also be applied to Boosting algorithms which handle other weak learners. For example, as an example of another weak learner, there exists an algorithm referred to as C4.5 (see, for example, C4.5: Programs for Machine Learning, Morgan Kaufmann Series in Machine Learning, J. Ross Quinlan, Morgan Kaufmann, 1993). The C4.5 learns a weak hypothesis (that is, a rule) in the form of a decision tree. When the present technique is applied to the C4.5, it is possible to apply the present technique in such a manner by learning more then one decision trees at each iteration.

Further, even in the case of a Boosting algorithm which handles a weak learner for classifying trees and graphs, the present technique may be similarly applied by learning more then one rules.

For example, see the following documents.

Document: Kudo Taku, Matsumoto Yuji, "A Boosting Algorithm for Classification of Semi-Structured Text", Proceedings of EMNLP 2004, pages 301-308, 2004.

Document: Taku Kudo, Eisaku Maeda, Yuji Matsumoto, "An Application of Boosting to Graph Classification", Proceedings of NIPS 2004, pages 729-736, 2005.

An embodiment of the present technique is summarized as follows.

An evaluation value g may also be calculated with the following formula from a feature f, feature-sets xi, labels yi, weights wi of training examples, and the number m of the training examples.

[Formula 35]

$$W_y(f) = \sum_{i=1}^{m} w_i [[f \subseteq x_i \wedge y_i = y]]$$

$$g = \left| \sqrt{W_{+1}(f)} - \sqrt{W_{-1}(f)} \right|$$

(where $[[\pi]]$ is 1 if a proposition $\pi$ holds and 0 otherwise).

Further, the confidence value c may also be calculated with the following formula from a feature f, feature-sets xi, labels yi, weights wi of training examples, the number m of the training examples, and a certain smoothing value ε.

[Formula 36]

$$W_y(f) = \sum_{i=1}^{m} w_i [[f \subseteq x_i \wedge y_i = y]]$$

$$c = \frac{1}{2} \ln\left( \frac{W_{+1}(f) + \varepsilon}{W_{-1}(f) + \varepsilon} \right)$$

(where $[[\pi]]$ is 1 if a proposition $\pi$ holds and 0 otherwise).

Further, the weights wt+1,i of the training examples, the weights of which are used for the (t+1)th processing, may also be calculated by the following formulas from the feature ft and the confidence value ct in the t-th processing, the feature-sets xi, the labels yi, the weights wt,i of the training examples in the t-th processing, and the number m of the training examples.

[Formula 37]

$$h_{(f,c)}(x) = \begin{cases} c & f \subseteq x \\ 0 & \text{Otherwise} \end{cases}$$

$$w_{t+1,i} = w_{t,i} \exp(-y_i h_{(f_t,c_t)}(x_i))$$

Alternatively, the weights wt+1,i of the training examples may also be calculated by dividing the above-obtained wt+1,i by Zt expressed as follows.

[Formula 38]

$$Z_t = \sum_{i=1}^{m} w_{i,t} \exp(-y_t h_{(f_t,c_t)}(x_i))$$

A program may be created for making a computer perform the present technique. The program may be stored in a computer readable storage medium such as, for example, a flexible disk, CD-ROM, a magneto-optical disk, a semiconductor memory, and a hard disk, or in a storage apparatus. Further, the program may also be distributed as digital signals via a network, and the like. Note that intermediate processing results may be temporarily stored in a storage apparatus, such as a main memory.

Figure 26:
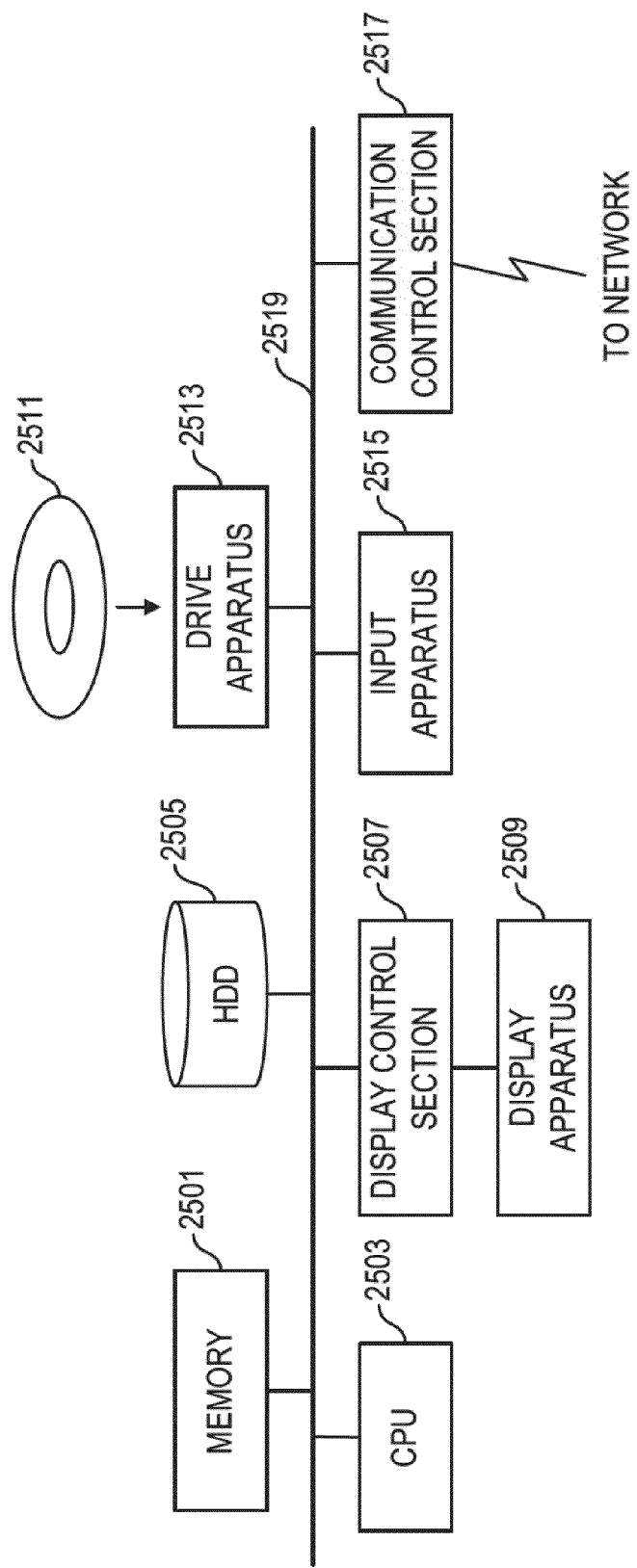
FIG. 26 is a functional block diagram of a computer.

Note that a business system analysis apparatus is a computer apparatus, and is, as illustrated in FIG. 26, connected, via a bus 2519, to a memory 2501, a CPU 2503, a hard disk drive (HDD) 2505, a display control section 2507 connected to a display apparatus 2509, a drive apparatus 2513 for a removable disc 2511, an input apparatus 2515, and a communication control section 2517 for effecting connection with a network. An operating system (OS) and an application program for performing the processing in the present embodiment are stored in the HDD 2505. When the program is executed by the CPU 2503, the program is read from the HDD 2505 to the memory 2501 by the CPU 2503. The display control section 2507, the communication control section 2517, and the drive apparatus 2513 are controlled by the CPU 2503 so as to perform various operations. Further, data in the middle of processing may be stored in the memory 2501, or may be stored in the HDD 2505. In the present embodiment of the present technique, the application program for performing the above described processing is stored in the computer readable removable disc 2511 so as to be distributed, and is installed in the HDD 2505 from the drive apparatus 2513.

There may also be a case where the application program is installed in the HDD 2505 via a network, such as the Internet, and the communication control section 2517. The computer apparatus configured as described above realizes the above described respective functions by effecting organized cooperation of the hardware, such as the CPU 2503 and the memory 2501, with the OS and the various application programs.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A rule learning method for making a computer perform rule learning processing in machine learning, the method comprising:
   firstly calculating an evaluation value to select a feature to be calculated for a confidence value for respective features registered in a training example data storage unit that stores a plurality of combinations of a training example and a weight of the training example, each training example including a feature-set with one or more features and a label indicating that the example is either true or false, by using data of the training examples and the weights of the training examples, and storing the calculated evaluation value in correspondence with the feature in an evaluation value storage unit;
   selecting a given number of features in descending order of the evaluation values stored in the evaluation value storage unit;
   secondly calculating of the confidence value for one of the given number of selected features, by using the data and the weights of the training examples registered in the training example data storage unit, and storing a combination of the confidence value and the one of the selected features in a rule data storage unit;
   updating the weights stored in the training example data storage unit, by using the data and the weights of the training examples and the confidence value corresponding to the one feature;
   firstly repeating the updating for a remaining feature of the given number of features; and
   secondly repeating, for a given number of times, the firstly calculating, the selecting, the secondly calculating, the updating, and the firstly repeating.

2. The rule learning method according to claim 1, wherein the evaluation value g is calculated from the feature f, the feature-sets xi, the labels yi, the weights wi of the training examples, and the number m of the training examples, by $$W_y(f) = \sum_{i=1}^{m} w_i [[f \subseteq x_i \wedge y_i = y]]$$

$$g = |\sqrt{W_{+1}(f)} - \sqrt{W_{-1}(f)}|$$

(where is 1 if a proposition π holds and 0 otherwise).

3. The rule learning method according to claim 1, wherein the confidence value c is calculated from the feature f, the feature-sets xi, the labels yi, the weights wi of the training examples, the number m of the training examples, and a given smoothing value ε, by $$W_y(f) = \sum_{i=1}^{m} w_i [[f \subseteq x_i \wedge y_i = y]]$$

$$c = \frac{1}{2} \ln\left(\frac{W_{+1}(f) + \varepsilon}{W_{-1}(f) + \varepsilon}\right)$$

(where is 1 if a proposition π holds and 0 otherwise).

4. The rule learning method according to claim 1, wherein the weights wt+1,i of the training examples for the (t+1)th processing are calculated from the feature ft and the confidence value ct in the t-th processing, the feature-sets xi, the labels yi, the weights wt,i of the training examples in the t-th processing, and the number m of the training examples, by $$h_{(f,c)}(x) = \begin{cases} c & f \subseteq x \\ 0 & \text{Otherwise} \end{cases}$$

$$w_{t+1,i} = w_{t,i} \exp(-y_i h_{(f_t,c_t)}(x_i))$$

or wherein the weights wt+1,i of the training examples for the (t+1)th processing are calculated by dividing the above-obtained wt+1,i by Zt as expressed by $$Z_t = \sum_{i=1}^{m} w_{i,t} \exp(-y_t h_{(f_t,c_t)}(x_i)).$$

5. A non-transitory computer-readable recording medium storing a rule learning program, which when executed by a computer, causes the computer to perform a method, the method comprising:
   firstly calculating an evaluation value of respective features registered in a training example data storage unit storing a plurality of combinations of a training example and a weight of the training example, each example including one or more features and a label showing that the example is either true or false, by using data of the training examples and the weights of the training examples, and storing the calculated evaluation value in correspondence with the feature in an evaluation value storage unit;
   selecting a given number of features in descending order of the evaluation values stored in the evaluation value storage unit;
   secondly calculating a confidence value for one of the given number of selected features, by using the data and the weights of the training examples in the training example data storage unit, and storing a combination of the confidence value and the one of the selected features in a rule data storage unit;
   updating the weights stored in the training example data storage unit by using the data and weights of the training examples and the confidence value corresponding to the one feature;
   firstly repeating the updating for the remaining features of the given number of features; and secondly repeating, for a given number of times, the firstly calculating, the selecting, the secondly calculating, the updating, and the firstly repeating.

6. A rule learning apparatus configured to perform rule learning processing in machine learning, the rule learning apparatus comprising:

a memory which stores a program;

a processor which executes, based on the program, a procedure comprising:

storing a plurality of combinations of training examples, each of which includes a feature-set that includes one or more features and a label showing that the training example is either true or false, with weights of the training examples;

calculating, for each of the one or more features, an evaluation value used for selecting a feature whose confidence value is to be calculated, based on the weights of the training examples, and storing the calculated evaluation value in correspondence with each of the one or more features;

selecting a given number of features in descending order of the calculated evaluation values;

calculating, for one of the selected given number of features, the confidence value based on the weights of the training examples, so as to store a combination of the one feature and the confidence value, and calculating a weight of each of the training examples, based on the weights of the training examples and the confidence value corresponding to the one feature, and updating the weights; and repeating processes for updating the weight for each of the given number of features.

* * * * *